United States Patent [19]

Montino et al.

[11] 3,850,612

[45] Nov. 26, 1974

[54] PROCESS FOR PREPARING FINELY PARTICLED NICKEL POWDERS HAVING A SPHEROIDAL FORM

[75] Inventors: Franco Montino, Casale Monferrato; Luigi Colombo, Arona, both of Italy

[73] Assignee: Montecatini Edison S.p.A., Milan, Italy

[22] Filed: Sept. 19, 1973

[21] Appl. No.: 398,852

[30] Foreign Application Priority Data
Sept. 25, 1972  Italy.................................. 29635/72

[52] U.S. Cl............................. 75/.5, 75/.5 A, 75/119
[51] Int. Cl......... C22b 23/00, B22f 5/00, B22f 9/00
[58] Field of Search.................. 75/.5 AA, .5 A, 119

[56] References Cited
UNITED STATES PATENTS
3,711,274  1/1973  Mentino et al. ...................... 75/.5 A
3,748,118  7/1973  Mentino et al..................... 75/.5 AA

*Primary Examiner*—L. Dewayne Rutledge
*Assistant Examiner*—Arthur J. Steiner
*Attorney, Agent, or Firm*—Stevens, Davis, Miller & Mosher

[57] ABSTRACT

A process is disclosed for preparing very finely divided, homogeneous metalic nickel powder of spheroidal shape, with a granulometric range between 0.03 and 0.7 microns and with a very narrow granulometric spectrum, by reduction with $H_2$ of a hydroalcoholic suspension of nickel hydroxide at temperatures between room temperature and 200°C, under partial pressures of $H_2$ between 20 and 100 atm., in the presence of bis-acrylonitrile-nickel in quantities between 15 and 0.5 g/mole of $Ni(OH)_2$, and optionally in the presence of pyridine in a quantity between 1 and 20 grams/liter of suspension, characterized in that the reduction reaction is conducted in the presence of a sulphur compound selected from the class consisting of hydrogen sulphide and alkali metal and alkaline earth metal sulphides in quantities corresponding to between 2 and 50 mg sulphur/mole of nickel hydroxide. Sodium and potassium sulphides and hydrogen sulphide are especially suitable.

8 Claims, No Drawings

PROCESS FOR PREPARING FINELY PARTICLED NICKEL POWDERS HAVING A SPHEROIDAL FORM

The present invention relates to a process for preparing a powder of metallic nickel. More particularly, it relates to a process for preparing finely divided, homogeneous, metallic nickel powder having a spheroidal form and with a very narrow granulometric spectrum and with a granulometric range between 0.03 and 0.7 microns.

The extraordinary development of powder metallurgy as an industrial technology has brought about a growing demand for "tailor-made" metal powders having carefully checked granulometric and morphological characteristics. More particularly, the sphericity of the particles is a desideratum when a greater uniformity in processing an in the end product is required. The spheroidal powders are particularly suited for "slip casting" because they yield "green castings" of greater uniformity and density.

The spheroidal powders moreover ensure a uniformity in size of the pores in the preparation of porous structures.

The very finely subdivided submicronic metal powders, and more particularly nickel powders, are specifically used to manufacture the "dispersion-strengthened alloys" consisting of fine mixtures of a dispersoid (oxide, boride, carbide) in the metallic nickel body.

The very finely subdivided powders are also used as catalysts where their specific surface is a key factor in the acceleration of the desired chemical reactions.

The submicronic powders may also have significant affects in powder metallurgy techniques due to the substantial decrease of the temperature and/or of the sintering time.

Of promising interest also is the use of these powders in the technology of thin films, in particular for miniaturized electronic devices.

Spheroidal submicronic powders are also conveniently used in the manufacture of porous electrodes and of filters or membranes having a controlled permeability. Due to the submicronic size of the pores, such membranes may be used for the desalting of brackish waters by osmosis; for the fractionation of molecules of various weights; for the isotopic enrichment of certain elements in respect of an especially desired isotope (e.g., the enrichment of $U^{235}$ of natural $UF_6$).

The spheroidal submicronic nickel powders, suspended or incorporated in a suitable carrier such as for instance: oils, paints, plastic materials, represent a useful raw material for magnetic varnishes and inks as well as for electroconductors, for magnetic change-over switches, for coatings in general and for lubricants.

In the field of powder metallurgy, these powders are used to manufacture microporous structures such as self-lubricating gears; different types of sintered alloys, and especially those based on Fe; and 'cutting tools' based on titanium carbide. More particularly for these latter applications, the use of a very finely divided and homogeneous metallic powder is of great advantage due to the better homogeneity of the end product.

The known processes for the preparation of fine nickel powders are: mechanical processes essentially based on grinding (ball milling, jet milling), physical processes that are based on the evaporation of the metal and subsequent condensation at low temperatures (e.g., arc vaporization, plasma flame spray), and chemical processes which include the reduction with $H_2$ of metal halides in gaseous phase, or of metal oxides or aqueous solutions or suspensions of metal salts, and the thermal decomposition of various nickel compounds (carbonyl, formates, oxalates, etc.).

Although some of these methods sometimes enable one to obtain very finely divded submicronic powders, none of them is capable of providing powders that will simultaneously satisfy the requisites of fineness, homogeneity, sphericity and low agglomeration.

Amongst the chemical processes that permit a satisfactory control of the granulometric characteristics of the powders, a few technologies are known based on the reduction under pressure with $H_2$ of solutions or suspensions of nickel salts or other nickel compounds. These known processes, however, show the drawback of producing powders which, although in some cases permitting one to obtain particles with a diameter of about 0.2 microns, nevertheless result in powders having a nominal micronic instead of a submicronic diameter, due to agglomeration and flocculation phenomena of the single particles during the preparation.

It is also known from a previous patent (Italian Pat. No. 913,893) to prepare metallic nickel as a very finely subdivided, homogeneous spheroidal powder by the reduction of a hydroalcoholic suspension of a nickel compound at temperatures ranging from 160°C to 250°C, and at $H_2$ partial pressures ranging from 25 and 100 atm., in the presence of additives such as pyridine and bis-acrylonitrile-nickel. By means of such method, however, it is only possible to obtain nickel powders having a diameter between 0.07 and 2 microns. Moreover, that process requires rather high quantities of bis-acrylonitrile-nickel.

The object of the present invention is to provide a simple and more economic process for preparing homogeneous, very finely divided, spheroidal submicronic powders, and especially those of nickel.

According to the present invention, it has been found that, if to the suspensions of the above-mentioned nickel compounds are added certain sulphur compounds, by suitably varying the processing conditions it is possible to obtain nickel powders having the desired characteristics and having diameters around 0.03 microns.

Thus, according to the present invention, an improved process is provided for preparing very finely divided, homogeneous and spheroidal metallic nickel powders in the granulometric range between 0.03 and 0.7 microns, and having a very narrow granulometric spectrum, by reduction with $H_2$ of a hydroalcoholic suspension of nickel hydroxide at temperatures between room temperature and +200°C, at hydrogen partial pressures between 20 and 100 atmospheres, in the presence of bis-acrylonitrile-nickel in quantities between 15 and 0.5 g/mole of $Ni(OH)_2$ and optionally pyridine in quantities between 1 and 20 g/liter of suspension, characterized in that the reduction reaction is carried out in the presence of a sulphur compound selected from the class consisting of hydrogen sulphide and alkali metal and alkaline earth metal sulphides, in quantities between 2 and 50 mg of sulphur/mole of nickel hydroxide.

The addition of $NH_3$ in quantities between 0.1 and 1 g/liter of suspension is preferable, but not necessary.

Operating according to the above described process, very finely divided, homogeneous, submicronic spheroidal nickel powders are obtained the granules of which are substantially completely monodispersed or at most very little aggregated.

According to a preferred embodiment of the invention, nickel hydroxide is suspended in a hydroalcoholic mixture in which the sulphur compound has been previously dissolved. To this suspension is then added bis-acrylonitrile-nickel in a quantity depending according to the granulometry that one wishes to obtain in the end product, and pyridine.

The hydrogen reduction of the hydroalcoholic suspension of the nickel hydroxide, containing the sulphur compound and the additives, is preferably carried out in a stainless steel autoclave fitted with a blade stirrer and with a resistance heater.

Operating according to the described process, the diameter of the granules may be readily controlled. In order to obtain a granule diameter below 0.07 microns, i.e., in the range of from 0.03 to 0.07 microns, the hydrogen is fed into the autoclave at room temperature and at a pressure between 20 and 100 atm., preferably around 40 atm. The autoclave is then heated up to a temperature between 100° and 180°C, and preferably around 150°C, for just a few minutes.

In order to obtain powders with a diameter $\geq 0.07$ microns, i.e., within the range of from 0.07 to 0.7 microns, the autoclave is heated up to 140°–200°C, but preferably to about 170°C, and then hydrogen is fed at a partial pressure between 40 and 100 atm., preferably at about 50 atm., and thereupon maintaining the temperature substantially constant until the $H_2$ absorption ends. The quantity of bis-acrylonitrile-nickel required in this instance will be considerably less than the quantity necessary for obtaining powders having diameters between 0.03 and 0.07 microns.

The nickel powder thus obtained is then washed and dried in a current of $N_2$ under vacuum. For the finer powders it is not necessary to extend the drying to the maximum in order to avoid a fast oxidation in the air.

Moreover, if they are heated up to little over 100°C, the powders with a diameter of $\leq 0.06$ microns will show under the electron microscope incipient sintering of the granules due to their extreme fineness.

The addition of the sulphur compound according to this invention makes it possible to:

obtain homogeneous, spheroidal nickel powders with a granulometric range between 0.03 and 0.07 microns by feeding hydrogen into the autoclave at room temperature;

obtain homogeneous spheroidal nickel powders within the granulometric range of 0.07 to 0.7 microns, by feeding hydrogen into the autoclave previously heated to the reduction temperature of the nickel hydroxide and with considerably reduced quantities of bis-acrylonitrile-nickel.

Among the various compounds suited for preparing the aqueous or hydroalcoholic solution, there may be used alcohols or glycols soluble in water. Better results are obtained by using a water/monoethylene glycol mixture in a volumetric ratio between 4:1 and 1:4 and preferably around 2:1.

The nickel hydroxide is suspended in the hydroalcoholic solution in concentrations between 0.3 and 1.1 mole/liter, and preferably in a concentration around 0.6 and 0.8 moles/liter.

Among the sulphur compounds particularly suited for addition to the hydroalcoholic solution are hydrogen sulphide and the alkali metal or alkaline earth metal sulphides, and of the latter preferably sodium sulphide or potassium sulphide.

The quantity of sulphur compound necessary is that which is compatible with a good chemical purity of the end product which will not be particularly polluted because not all the sulphur introduced into the reaction will combine with the nickel.

The sulphur compound is added in quantities corresponding to between 2 to 50 mg of sulphur/mole of Ni-$(OH)_2$, and preferably between 5 and 15 mg sulphur/-mole of $Ni(OH)_2$.

the quantity of bis-acrylonitrile-nickel added to the hydroalcoholic suspension may vary from 15 to 0.5 g/mole of nickel hydroxide, depending on the diameter of the granules that one wishes to obtain.

Compounds suited for use as additives to the hydroalcoholic suspension in order to promote a greater uniformity of the powder are: pyridine in a quantity of between 1 and 20 g/liter of suspension, and preferably 5 to 10 g/liter, and ammonia in a quantity of between 0.1 and 1 g/liter of suspension.

The most significant advantages exhibited by the process according to the present invention may be summarized as follows:

short reaction times and low reaction temperatures;

the possibility of obtaining very finely divided powders with different diameters within the range 0.03 to 0.7 microns depending on varying the operational conditions;

the almost total absence of aggregates in the powder;

a lower consumption of bis-acrylonitrile-nickel.

The present invention will be now described still greater in detail with reference to the following examples:

EXAMPLE 1

178 grams of $Ni(OH)_2$ still wet with water (obtained from $NiCl_2$ by precipitation with NaOH, at 90°C, and subsequent filtering and washing of the precipitate until the wash water shows the mostly disappearance of NaCl) and corresponding to 46.3 g of dry $Ni(OH)_2$ (0.5 moles) and 132 g of $H_2O$, were suspended in a solution of 348 cc of water and 240 cc of monoethylene glycol so as to have on the whole 720 cc of a solution with a water/glycol ratio of 2:1. To this hydroalcoholic solution there had previously been added 4 mg of sulphur (as $Na_2S$) as an aqueous solution of known titre.

To the hydroalcoholic $Ni(OH)_2$ suspension, maintained under $N_2$, were added 5 g of bis-acrylonitrile-nickel, 8 cc of pyridine and 2 cc of $NH_4OH$ (a 30 % $NH_3$ solution). The percentage of Ni added as bis-acrylonitrile-nickel with respect to the total Ni amounted to 5.7 percent.

This suspension was then transfered to a 2 liter autoclave of AISI 316 steel, fitted with a blade stirrer driven by a magnetic coupling at 400 r.p.m., and with a conventional electrical resistance heater.

After eliminating the air by means of $N_2$, the autoclave was charged with an $H_2$ pressure of 40 atm., the stirrer was started, and the heating begun. Then the inside temperature was brought up to 150°C over a period of 50 minutes and maintained at that value for 15 minutes. Thereupon the autoclave was cooled down and the product discharged.

The powder was separated magnetically, washed with water and then with methanol, dried in a current of nitrogen at 80°C and then under vacuum at the same temperature.

In this way there were obtained 31 g of powder which may have as much as 2 to 5 percent of solvent (methanol and/or water). In the mother liquor the Ni was practically absent.

Under the electron microscope the nickel powder thus obtained showed up as spheroidal homogenous granules with a low degree of aggregation, and with an average diameter of 0.04 microns.

The granulometric count showed that 92 percent of the individual granules had a diameter between 0.030 and 0.057 microns.

EXAMPLE 2

A hydroalcoholic $Ni(OH)_2$ suspension was prepared according to Example 1 above, except that the $Na_2S$ was omitted. This suspension was then subjected to reduction under the same conditions as those described in Example 1. The autoclave in which the reduction was carried out was first washed out with $HNO_3$ to avoid pollution (from sulphur) from the preceding tests.

In this way, there was obtained a powder of individual granules having a diameter around 0.3 microns, rather aggregated and of an irregular shape.

This test showed that the introduction of hydrogen into the autoclave initially at room temperature was not a sufficient condition for obtaining powders with a diameter below 0.06 microns if in the hydroalcoholic suspension of $Ni(OH)_2$ there had been omitted the addition of the sulphur compound.

EXAMPLE 3

The following example shows that the addition of a sulphur compound enables one to obtain submicronic nickel powders with homogeneous spheroidal granules having a low degree of aggregation. However, the presence of a sulphur compound in the hydroalcoholic suspension was not a sufficient condition for obtaining powders with a granular diameter below 0.06 microns if the reduction was conducted by feeding $H_2$ into the autoclave which was previously heated.

A hydroalcoholic suspension (prepared according to Example 1 above) was subjected to a reduction test similar to that described above in Example 1, except for the $H_2$ which was here introduced with a partial pressure of 50 atm. into the autoclave heated beforehand to 170°C. The temperature was maintained constant until the manometer attached to the autoclave indicated a pressure drop (35 minutes).

In this way, there was obtained a powder consisting of homogeneous spheroidal granules having a low degree of aggregation. The average diameter of the granules in this instance, however, was between 0.06 and 0.07 microns.

EXAMPLE 4

This example was carried out as described above in Example 1 except that 1 gram of bis-acrylonitrile-nickel was used instead of 5 grams. In this case the Ni percentage introduced as the organometallic complex, with respect to the total Ni, amounted to 1.2 percent.

The $H_2$ was fed into the autoclave heated to 170°C at a partial pressure of 50 atm., maintaining the temperature until the absorption of $H_2$ was completed (about 40 minutes).

In this way, there were obtained 30 g of a powder of homogeneous spheroidal granules showing a low degree of aggregation, and having an average diameter of 0.09 microns.

EXAMPLE 5

This example was carried out according to the procedure described in Example 1 above, except that:
instead of 5 g, 0.5 g of bis-acrylonitrile-nickel was used. In this case the percentage of Ni, introduced as the organometallic complex, with reference to the total Ni, amounted to 0.6 percent.

the $H_2$ was introduced into the autoclave heated to 170°C, with a partial pressure of 50 atm, the temperature being maintained until complete absorption of the $H_2$ (about 40 minutes). 30 g of nickel powder of homogeneous, only slightly aggregated, spheroidal granules having an average diameter of 0.14 microns were thus obtained.

EXAMPLE 6

265 grams of $Ni(OH)_2$ still wet with water, and corresponding to 69 g. of dry $Ni(OH)_2$ (0.75 moles), and 196 g. of water were suspended in a solution of 304 cc. of water and 250 cc. of monoethylene/glycol so as to have on the whole 750 cc. of a solution with a water/glycol ratio of 2:1.

To the hydroalcoholic suspension of $Ni(OH)_2$ were added 1.5 mg. of sulphur (as $Na_2S$), 0.35 g. of bis-acrylonitrile-nickel, 12 cc. of pyridine, and 2 cc. of $NH_4OH$ (as a 30% $NH_3$ solution).

The reduction was then carried out by introducing hydrogen (50 atm.) into the autoclave which was previously heated to 180°C.

There were thus obtained spheroidal and homogeneous nickel powders having an average diameter between 0.6 and 0.7 microns.

EXAMPLE 7

A hydroalcoholic suspension of $Ni(OH)_2$ was prepared as in Example 6 above. To the suspension were added 35 mg. of sulphur (as $Na_2S$), 6 g. of bis-acrylonitrile-nickel, 12 cc. of pyridine, and 3 cc. of $NH_4OH$ (as a 30% $NH_3$ solution).

The reduction was then carried out by introducing hydrogen (45 atm.) into the autoclave at room temperature, after which the temperature was brought up to 150°C for a few minutes.

There was thus obtained a nickel powder consisting of spheroidal and homogeneous granules having an average diameter around 0.03 microns.

EXAMPLE 8

This example was carried out as described above in Example 7 except that there were introduced 10 mg. of sulphur as $H_2S$.

There was thus obtained a nickel powder consisting of homogeneous and spheroidal granules having an average diameter between 0.03 and 0.04 microns.

What is claimed is:

1. In a process for preparing very finely divided, homogeneous metallic nickel powder of spheroidal shape, with a granulometric range between 0.03 and 0.7 microns and with a very narrow granulometric spectrum, by reduction with $H_2$ of a hydroalcoholic suspension of nickel hydroxide at temperatures between room temperature and 200°C, under partial pressures of $H_2$ between 20 and 100 atm., in the presence of bis-acrylonitrile-nickel in quantities between 15 and 0.5 g/mole of $Ni(OH)_2$, and optionally in the presence of pyridine in a quantity between 1 and 20 grams/liter of the suspension, the improvement wherein the reduction reaction is conducted in the presence of a sulphur compound selected from the class consisting of hydrogen sulphide and alkali metal and alkaline earth sulphides in quantities corresponding to between 2 and 50 mg sulphur/mole of nickel hydroxide.

2. A process according to claim 1, wherein the sulphide is hydrogen sulphide or sodium or potassium sulphide.

3. A process according to claim 1, wherein the quantity of sulphide corresponds to between 5 and 15 mg sulphur/mole of $Ni(OH)_2$.

4. A process according to claim 3, wherein the sulphide is hydrogen sulphide or sodium or potassium sulphide.

5. A process according to claim 1, for the preparation of very finely divided nickel powders in the granulometric range of 0.03 to 0.07 microns, characterized in that the hydroalcoholic suspension of $Ni(OH)_2$, previously additioned with an alkali metal or alkaline earth metal sulphide in quantities corresponding to between 2 to 50 mg sulphur/mole of $Ni(OH)_2$, is treated with $H_2$ at room temperature, at partial pressures of from 20 to 100 atm., in the presence of bis-acrylonitrile-nickel in quantities between 7 to 15 g/mole of $Ni(OH)_2$, and optionally with pyridine in quantities between 5 to 10 g per liter of suspension, and in that the suspension is then brought up gradually to a temperature between 100° to 180°C.

6. A process according to claim 5, wherein the final temperature of hydrogen treatment is around 150°C.

7. A process according to claim 5, wherein the sulphide is hydrogen sulphide or sodium or potassium sulphide.

8. A process according to claim 5, for preparing very finely divided, spheroidal, homogeneous nickel powders with a granulometry within the range 0.03 to 0.07 microns, characterized in that the hydroalcoholic suspension of $Ni(OH)_2$, previously additioned with sodium sulphide in quantities corresponding to between 5 to 15 mg sulphur/mole of $Ni(OH)_2$, is treated with $H_2$ at room temperature and under a pressure around 40 atm., in the presence of bis-acrylonitrile-nickel in quantities between 7 and 15 g/mole of $Ni(OH)_2$, and optionally with pyridine in quantities between 5 to 10 g/litre of the suspension, and in that the suspension is then gradually brought up to a temperature of around 150°C.

* * * * *